(12) United States Patent
Nemoto (10) Patent No.: US 11,780,439 B2
(45) Date of Patent: Oct. 10, 2023

(54) CONTROL DEVICE AND CONTROL METHOD FOR EXECUTING AND CANCELING HILL-HOLD CONTROL

(71) Applicant: Robert Bosch GmbH, Stuttgart (DE)

(72) Inventor: Nobuho Nemoto, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 823 days.

(21) Appl. No.: 16/065,341

(22) PCT Filed: Nov. 28, 2016

(86) PCT No.: PCT/IB2016/057151
§ 371 (c)(1),
(2) Date: Jun. 22, 2018

(87) PCT Pub. No.: WO2017/109611
PCT Pub. Date: Jun. 29, 2017

(65) Prior Publication Data
US 2021/0206376 A1 Jul. 8, 2021

(30) Foreign Application Priority Data
Dec. 22, 2015 (JP) .................... 2015-250581

(51) Int. Cl.
*B60W 30/18* (2012.01)
*B60T 7/12* (2006.01)
(Continued)

(52) U.S. Cl.
CPC ....... *B60W 30/18118* (2013.01); *B60T 7/122* (2013.01); *B60T 8/1706* (2013.01);
(Continued)

(58) Field of Classification Search
CPC ......... B60W 30/18118; B60W 10/182; B60W 2300/36; B60W 2510/188; B60T 7/122; B60T 8/1706; B60T 2201/06; B62K 23/04
See application file for complete search history.

(56) References Cited

U.S. PATENT DOCUMENTS 5,137,127 A * 8/1992 Braun ................... B60W 10/18
477/196
6,439,675 B1 * 8/2002 Zechmann .............. B60T 13/74
303/191
(Continued)

FOREIGN PATENT DOCUMENTS

DE  4218717 A1  12/1993
DE  19912878 A1  4/2000
(Continued)

OTHER PUBLICATIONS

Translated and annotated Inoue (JP-2006315663) (Year: 2006).*
(Continued)

*Primary Examiner* — James M McPherson
*Assistant Examiner* — Kyle J Kingsland
(74) *Attorney, Agent, or Firm* — Michael Best & Friedrich LLP (57) ABSTRACT

Controller and control method for improving operability at a time when a brake force that is retained in hill-hold control is reduced. A control section for executing the hill-hold control that retains the brake force on an inclined road surface is provided. The control section cancels retention of the brake force in the case where it is determined on the basis of a detection signal of a first detection mechanism that a first operation section for operating a brake mechanism is operated when the brake force is retained in the hill-hold control.

6 Claims, 7 Drawing Sheets

(51) Int. Cl.
*B60T 8/17* (2006.01)
*B60W 10/18* (2012.01)
*B62K 23/04* (2006.01)

(52) U.S. Cl.
CPC ........... *B60W 10/182* (2013.01); *B62K 23/04* (2013.01); *B60T 2201/06* (2013.01); *B60W 2300/36* (2013.01); *B60W 2510/188* (2013.01)

(56) References Cited

U.S. PATENT DOCUMENTS

| | | | | |
|---|---|---|---|---|
| 7,762,633 | B2 * | 7/2010 | Maskell | B60T 7/122 303/192 |
| 8,412,436 | B2 * | 4/2013 | Mallet | B60T 7/122 701/83 |
| 9,387,841 | B2 * | 7/2016 | Beever | B60T 7/122 |
| 2008/0086252 | A1 | 4/2008 | Nakayama | |
| 2008/0195289 | A1 * | 8/2008 | Sokoll | B60T 7/122 701/70 |
| 2010/0004095 | A1 * | 1/2010 | Sokoll | B60T 7/122 477/198 |
| 2010/0138123 | A1 | 6/2010 | Tokimasa et al. | |
| 2010/0168974 | A1 | 7/2010 | Bradley, IV | |
| 2014/0067231 | A1 | 3/2014 | Mosher et al. | |

FOREIGN PATENT DOCUMENTS

| | | | |
|---|---|---|---|
| DE | 102005023876 A1 | 1/2006 | |
| DE | 102006026736 A1 | 12/2007 | |
| DE | 102007025273 A1 | 1/2008 | |
| DE | 102008016659 A1 | 10/2009 | |
| EP | 3205538 A1 | 8/2017 | |
| EP | 3321142 A1 | 5/2018 | |
| GB | 2483719 A | 3/2012 | |
| JP | 2006315663 A | 11/2006 | |
| JP | 2007246051 A | 9/2007 | |
| JP | 2015030293 A * | 2/2015 | ............. B60T 7/122 |
| WO | 2014027111 A1 | 2/2014 | |

OTHER PUBLICATIONS

English translation of Takahiro et al. (JP 2015030293) (Year: 2015).*
Partial English human translation of Takahiro (201530293) (Year: 2015).*
International Search Report with English translation and Written Opinion for Application No. PCT/IB2016/057151 dated Apr. 11, 2017 (12 pages).

* cited by examiner

CONTROL DEVICE AND CONTROL METHOD FOR EXECUTING AND CANCELING HILL-HOLD CONTROL

BACKGROUND OF THE INVENTION

The invention relates to a controller for a motorcycle and a control method of the same.

As a controller for a vehicle, a controller that executes hill-hold control for retaining a brake force of a brake mechanism even when an occupant of the vehicle releases a brake pedal or the like has been available (for example, see PTL 1). In regard to the controller described in PTL 1, an accelerating operation by the occupant is required to reduce the brake force that is retained in the hill-hold control.

CITATION LIST

Patent Literature

PTL1: JP-A-2007-246051

SUMMARY OF THE INVENTION

In general, the accelerating operation of the motorcycle is performed through motion of turning an accelerator grip that is provided on a handlebar. Motion of twisting a wrist is required for the motion of turning the accelerator grip. When the accelerating operation is adopted as an operation for reducing the brake force retained in the hill-hold control of the motorcycle, the occupant may find difficulty in performing the operation depending on circumstances.

The invention has been made with a problem as described above as the background and therefore has a purpose of providing a controller and a control method capable of improving operability at a time when a brake force that is retained in hill-hold control is reduced.

A controller according to the invention is a controller for controlling a brake mechanism that generates a brake force on a motorcycle, and includes: a detection section for detecting an operation of a first operation section that operates the brake mechanism; and a control section for executing hill-hold control that retains the brake force on an inclined road surface. The control section cancels retention of the brake force in the case where it is determined on the basis of a detection signal of the detection section that the first operation section is operated when the brake force is retained in the hill-hold control.

A control method according to the invention is a control method of a motorcycle for executing hill-hold control that retains a brake force of a brake mechanism on an inclined road surface, and includes the steps of: retaining the brake force in the hill-hold control; determining whether a first operation section for operating the brake mechanism is operated; and canceling retention of the brake force that is retained in the hill-hold control in the case where it is determined that the first operation section is operated.

In the controller and the control method according to the invention, whether to reduce the brake force that is retained in the hill-hold control is determined on the basis of the operation of the first operation section for operating the brake mechanism. Therefore, operability at a time when the brake force retained in the hill-hold control is reduced is improved.

DETAILED DESCRIPTION

A description will hereinafter be made on a controller and a control method according to the invention by using the drawings. Each of a configuration, an operation, and the like, which will be described below, is merely one example, and each of the controller and the control method according to the invention is not limited to a case with such a configuration, such an operation, and the like. For example, the controller and the control method according to the invention may perform an operation other than brake control.

In addition, in each of the drawings, detailed portions are depicted in an appropriately simplified manner or are not depicted. Furthermore, overlapping descriptions are appropriately simplified or are not made.

First Embodiment

<Overall Configuration of a Hydraulic Pressure Control System 100>

Figure 1:
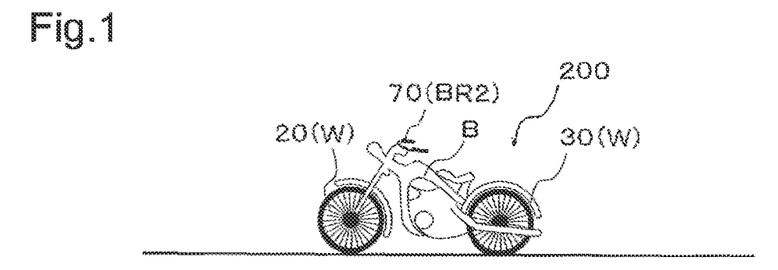
FIG. 1 is a view that schematically depicts a motorcycle including a controller according to a first embodiment of the invention.
Figure 2:
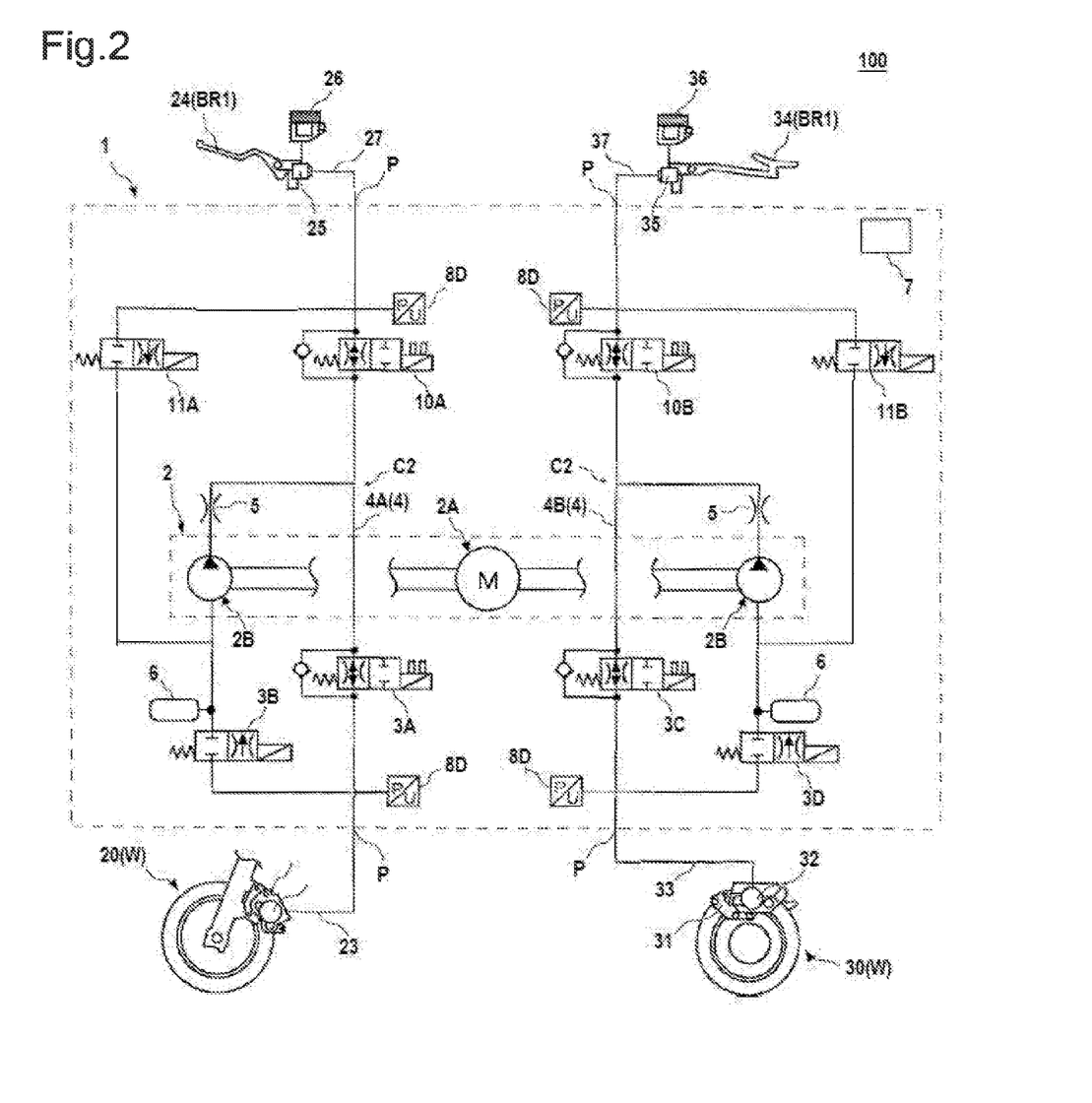
FIG. 2 is a schematic configuration diagram of a hydraulic pressure control system that includes the controller according to the first embodiment of the invention.

FIG. 1 is a view that schematically depicts a motorcycle including a controller according to this first embodiment. FIG. 2 is a schematic configuration diagram of a hydraulic pressure control system that includes the controller according to this first embodiment.

A hydraulic pressure control system 100 is mounted in a motorcycle 200 and includes a controller 1 that generates a brake force on a wheel W (a front wheel 20 and a rear wheel 30).

The motorcycle 200 is formed by combining the wheel W, a vehicle body B, and the controller 1. The vehicle body B includes all components of the motorcycle 200 except for the controller 1 and the wheel W. In addition, the motorcycle 200 will be described as a two-wheeled vehicle in this embodiment. However, the motorcycle 200 is not limited thereto and may be a three-wheeled vehicle. An accelerator grip 70 is provided on a handlebar of the motorcycle 200.

The motorcycle 200 includes the front wheel 20 and the rear wheel 30 as well as a handlebar lever 24 and a foot pedal 34 that are operated by an occupant. When this handlebar lever 24 is operated, the brake force on the front wheel 20 is changed. When the foot pedal 34 is operated, the brake force on the rear wheel 30 is changed.

The hydraulic pressure control system 100 includes: a front-wheel hydraulic circuit C1 through which a brake fluid used to generate the brake force on the front wheel 20 flows;

and a rear-wheel hydraulic circuit C2 through which a brake fluid used to generate the brake force on the rear wheel 30 flows.

The hydraulic pressure control system 100 includes: a front brake pad 21 that is attached to the front wheel 20; a front wheel cylinder 22 in which a front brake piston (not depicted) for causing movement of the front brake pad 21 is provided in a freely slidable manner; and a brake fluid pipe 23 that is connected to the front wheel cylinder 22.

The hydraulic pressure control system 100 includes: a first master cylinder 25 that is attached to the handlebar lever 24; a first reservoir 26 that stores the brake fluid; and a brake fluid pipe 27 that is connected to the first master cylinder 25. Note that a master cylinder piston (not depicted) is provided in a freely slidable manner in the first master cylinder 25. When the handlebar lever 24 is operated, the master cylinder piston in the first master cylinder 25 moves.

The hydraulic pressure control system 100 includes: a rear brake pad 31 that is attached to the rear wheel 30; a rear wheel cylinder 32 in which a rear brake piston (not depicted) for causing movement of the rear brake pad 31 is provided in a freely slidable manner; and a brake fluid pipe 33 that is connected to the rear wheel cylinder 32.

The hydraulic pressure control system 100 includes: a second master cylinder 35 that is attached to the foot pedal 34; a second reservoir 36 that stores the brake fluid; and a brake fluid pipe 37 that is connected to the second master cylinder 35. Note that a master cylinder piston (not depicted) is provided in a freely slidable manner in the second master cylinder 35. When the foot pedal 34 is operated, the master cylinder piston in the second master cylinder 35 moves.

<Description on a Configuration of the Controller 1>

The controller 1 includes: an internal channel 4 through which the brake fluid flows; and a pump device 2 that is used to feed the brake fluid in the internal channel 4 to the first master cylinder 25 side and the second master cylinder 35 side. Note that the internal channel 4 includes: an internal channel 4A that constitutes a part of the front-wheel hydraulic circuit C1; and an internal channel 4B that constitutes a part of the rear-wheel hydraulic circuit C2.

In addition, the controller 1 includes a freely openable/closable regulating valve 3. Note that the regulating valve 3 includes a first pressure boosting valve 3A, a first pressure reducing valve 3B, a second pressure boosting valve 3C, and a second pressure reducing valve 3D. The regulating valve 3 is, for example, a valve that is opened or closed when brake control such as control of an antilock brake system (ABS) is executed.

Furthermore, the controller 1 includes a switching valve 10, an opening degree of which can freely be adjusted, and a freely openable/closable inlet valve 11. The switching valve 10 includes: a switching valve 10A that is provided in the front-wheel hydraulic circuit C1; and a switching valve 10B that is provided in the rear-wheel hydraulic circuit C2. When the switching valve 10A is closed, a hydraulic pressure of the brake fluid in the front wheel cylinder 22 is retained, and retention of the brake force on the front wheel 20 is thereby realized. In addition, when the switching valve 10B is closed, a hydraulic pressure of the brake fluid in the rear wheel cylinder 32 is retained, and retention of the brake force on the rear wheel 30 is thereby realized.

The inlet valve 11 includes: an inlet valve 11A that is provided in the front-wheel hydraulic circuit C1; and an inlet valve 11B that is provided in the rear-wheel hydraulic circuit C2. The inlet valve 11A is opened when the pressure of the front wheel cylinder 22 is boosted. The inlet valve 11B is opened when the pressure of the rear wheel cylinder 32 is boosted. Note that each of the regulating valve 3, the switching valve 10, and the inlet valve 11 is an electromagnetic valve that includes a solenoid, for example.

The controller 1 includes a control section 7 that controls opening/closing and the like of the regulating valve 3, the switching valve 10, and the inlet valve 11. Note that a part or a whole of the control section 7 may be constructed of a microcomputer, a microprocessor unit, or the like, may be constructed of a member in which firmware and the like can be updated, or may be a program module or the like that is executed by a command from a CPU or the like, for example.

The controller 1 includes a detection mechanism 8 that outputs detection signals to the control section 7. The detection mechanism 8 includes: an acceleration sensor 8A (see FIG. 3) that is used to obtain an inclination value of a road surface; a first detection section 8B1 (see FIG. 3) that is used to detect an operation of the handlebar lever 24; a first detection section 8B2 (see FIG. 3) that is used to detect an operation of the foot pedal 34; a front-wheel speed sensor 8C1 (see FIG. 3) and a rear-wheel speed sensor 8C2 (see FIG. 3) that are respectively used to compute a wheel speed of the front wheel 20 and a wheel speed of the rear wheel 30 of the motorcycle 200; and a pressure sensor 8D that detects a hydraulic pressure of the brake fluid in the internal channel 4. For example, the first detection section 8B1 is a position detection sensor that is provided on the handlebar lever 24, and the first detection section 8B2 is a position detection sensor that is provided on the foot pedal 34.

The controller 1 includes various ports P that are connected to corresponding fluid pipes such as the brake fluid pipe 23. In addition, the controller 1 includes: a float restrictor 5 that restricts a flow rate of the brake fluid flowing through the internal channel 4; and an accumulator 6 that can store the brake fluid.

The switching valve 10A, the inlet valve 11A, the first pressure boosting valve 3A, the first pressure reducing valve 3B, and the like are provided in the internal channel 4A. The internal channel 4A is connected to the brake fluid pipe 23 and the brake fluid pipe 27 via the ports P. The switching valve 10B, the inlet valve 11B, the second pressure boosting valve 3C, the second pressure reducing valve 3D, and the like are provided in the internal channel 4B. The internal channel 4B is connected to the brake fluid pipe 33 and the brake fluid pipe 37 via the ports P.

The pump device 2 includes: a drive mechanism 2A that can be constructed of a DC motor and the like, for example; and two pump elements 2B, to each of which drive power is provided by the drive mechanism 2A. The drive mechanism 2A includes a stator, a rotor, and the like, and a rotational frequency thereof is controlled by the control section 7. One of the pump elements 2B is used to feed the brake fluid in the front-wheel hydraulic circuit C1 and is provided in the internal channel 4A. The other of the pump elements 2B is used to feed the brake fluid in the rear-wheel hydraulic circuit C2 and is provided in the internal channel 4B.

The control section 7 executes the hill-hold control under a certain condition. In the hill-hold control, the brake force of the motorcycle 200 is retained for a certain time in the case where the occupant of the motorcycle 200 releases the handlebar lever 24 and the foot pedal 34 in a state where the motorcycle 200 is stopped on an inclined road surface. Even before the certain time elapses, the control section 7 cancels retention of the brake force and reduces the brake force in response to an operation by the occupant.

Configuration Example of the Control Section 7

Figure 3:
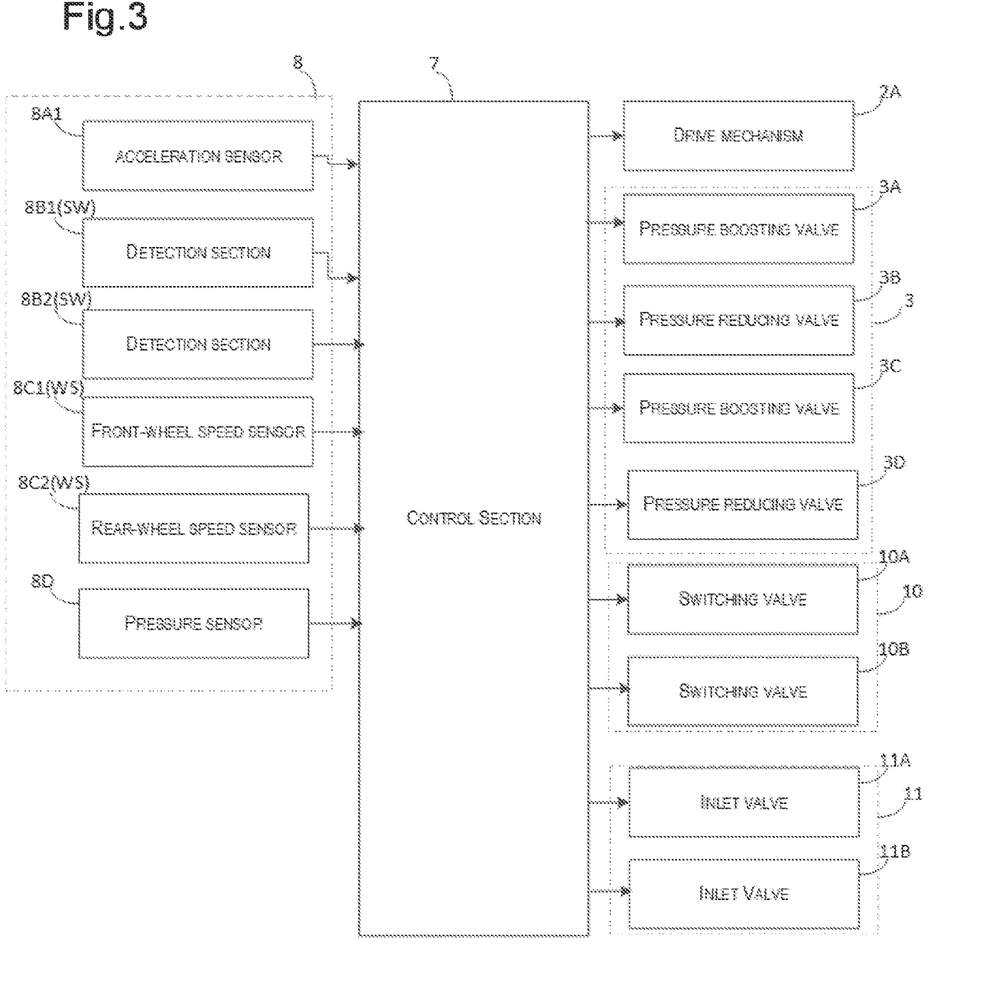
FIG. 3 is a functional block diagram of various sensors, a control section, and various actuators provided in the hydraulic pressure control system that includes the controller according to the first embodiment of the invention.
Figure 4:
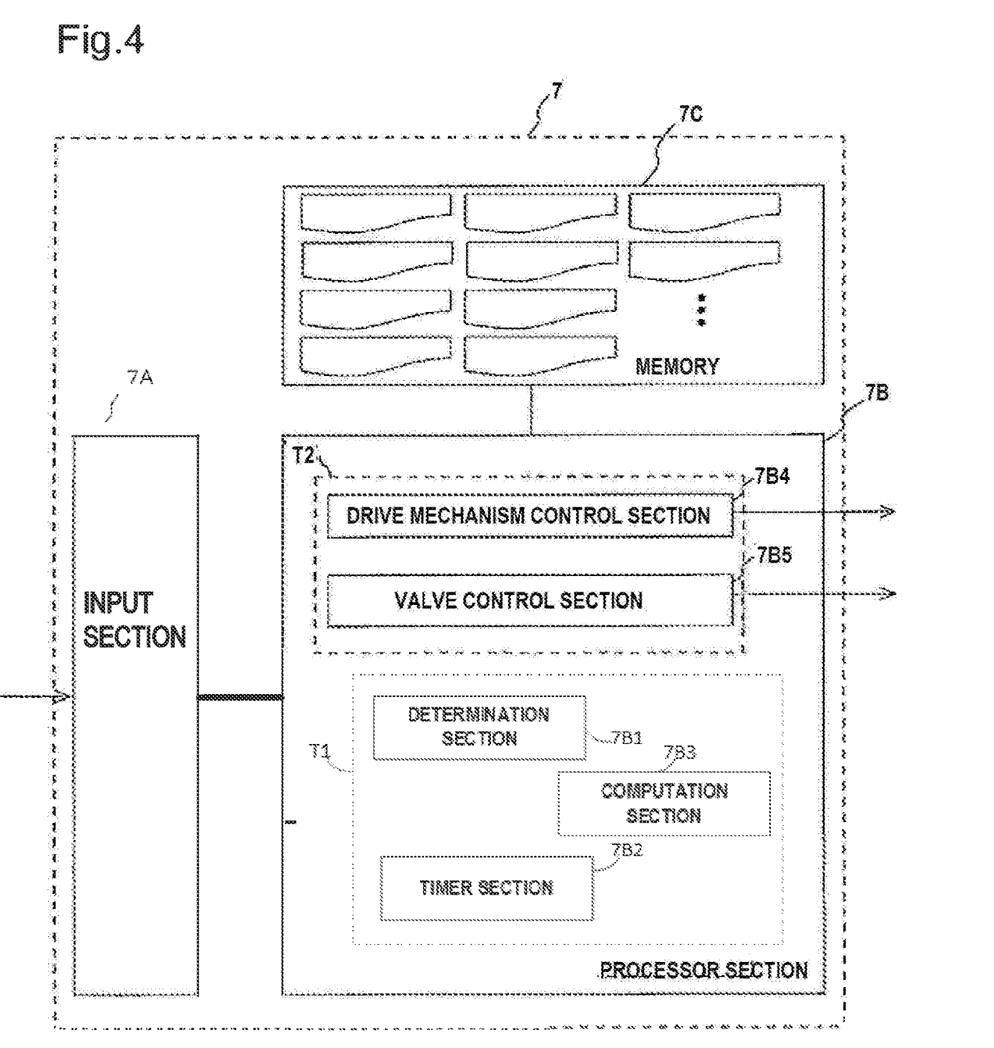
FIG. 4 is a functional block diagram of the control section of the controller according to the first embodiment of the invention.

FIG. 3 is a functional block diagram of the various sensors, the control section, and various actuators provided in the hydraulic pressure control system that includes the controller according to this first embodiment. FIG. 4 is a functional block diagram of the control section of the controller according to this first embodiment. A description will be made on a configuration example of the control section 7 with reference to FIG. 3 and FIG. 4.

Note that the first pressure boosting valve 3A and the second pressure boosting valve 3C are opened and the first pressure reducing valve 3B and the second pressure reducing valve 3D are closed in the following description. The front-wheel speed sensor 8C1 and the rear-wheel speed sensor 8C2 are also collectively referred to as a wheel speed sensor WS. The handlebar lever 24 and the foot pedal 34 are also collectively referred to as a first operation section BR1. The first detection section 8B1 and the first detection section 8B2 are also collectively referred to as a first detection section SW.

A brake mechanism means a configuration of generating the brake force on the motorcycle 200. For example, the switching valve 10, the inlet valve 11, the pump device 2, and the like correspond to the brake mechanism.

The control section 7 includes: an input section 7A that receives the signals from the detection mechanism 8; a processor section 7B that makes various determinations and the like; and a memory section 7C in which various types of data are stored.

(Input Section 7A)

The input section 7A is, for example, constructed of a circuit that includes an input circuit for receiving the signals from the detection mechanism 8, and the like. The signals received by the input section 7A are output to the processor section 7B.

(Processor Section 7B)

The processor section 7B includes an arithmetic section T1 and an actuator control section T2. The arithmetic section T1 includes a determination section 7B1, a timer section 7B2, and a computation section 7B3. The processor section 7B can be constructed of a microcontroller and the like, for example.

The determination section 7B1 determines whether to execute the hill-hold control. Here, the hill-hold control includes a retention mode and a cancellation mode. The retention mode is a mode in which the brake force of the motorcycle 200 is retained. The cancellation mode is a mode in which the retention of the brake force in the retention mode is cancelled and the brake force is reduced. Thus, timing at which the brake force, which has been retained in the hill-hold control, starts to be reduced is shift timing from the retention mode to the cancellation mode.

The determination section 7B1 determines whether the inclination value of the road surface is larger than a prescribed value, determines whether the motorcycle 200 is stopped, and determines whether the first operation section BR1 is released.

When determining that the inclination value of the road surface is larger than the prescribed value, that the motorcycle 200 is stopped, and that the first operation section BR1 is released, the determination section 7B1 determines to execute the retention mode of the hill-hold control.

Note that the inclination value that is computed by the computation section 7B3 on the basis of a detection signal of the acceleration sensor 8A is used to determine whether the inclination value of the road surface is larger than the prescribed value. In addition, the wheel speed that is computed by the computation section 7B3 is used to determine whether the motorcycle 200 is stopped. Furthermore, a detection signal of the first detection section SW is used to determine whether the first operation section BR1 is released.

In addition, on the basis of a signal from the timer section 7B2, the determination section 7B1 determines whether the certain time has elapsed since initiation of the retention mode. When said certain time elapses, the control section 7 shifts from the retention mode to the cancellation mode. Said certain time is set to approximately a few seconds, for example.

Furthermore, the determination section 7B1 determines whether the first operation section BR1 is operated during execution of the retention mode. As the operation of the first operation section BR1 herein, for example, a pumping operation in which one of the handlebar lever 24 and the foot pedal 34 is successively operated, a long pressing operation, or the like can be adopted. In addition, an operation in which plural different operations are combined can also be adopted. For example, a combination of the pumping operation and the long pressing operation may be adopted, or a combination of the operation of the handlebar lever 24 and the operation of the foot pedal 34 may be adopted. The detection signal of the first detection section SW is used to determine whether the first operation section BR1 is operated. Contents of the operation of the first operation section BR1 may freely be set by the occupant of the motorcycle 200 or the like.

When the first operation section BR1 is operated, pressures of the first master cylinder 25 and the second master cylinder 35 are changed, for example. The pressures of the front wheel cylinder 22 and the rear wheel cylinder 32 are also changed. For this reason, a pressure that is computed by the computation section 7B3 on the basis of a detection signal of the pressure sensor 8D can also be used for the above-described determination of whether the first operation section BR1 is released and the above-described determination of whether the first operation section BR1 is operated.

Moreover, in the case where the cancellation mode is executed, the determination section 7B1 determines whether cylinder pressure that is computed by the computation section 7B3 is lower than a prescribed pressure. Note that said determination is used to obtain timing of terminating the cancellation mode.

The timer section 7B2 counts a period from the initiation of the retention mode until a lapse of the certain time, and the like, for example.

The computation section 7B3 computes the wheel speed on the basis of a detection signal of the wheel speed sensor WS. The computation section 7B3 also computes the cylinder pressure on the basis of the detection signal of the pressure sensor 8D. Furthermore, the computation section 7B3 can also compute the pressures of the first master cylinder 25 and the second master cylinder 35 on the basis of the detection signal of the pressure sensor 8D.

The actuator control section T2 includes a drive mechanism control section 7B4 and a valve control section 7B5.

The drive mechanism control section 7B4 controls the rotational frequency of the drive mechanism 2A.

The valve control section 7B5 controls opening/closing operations of the regulating valve 3, the switching valve 10, and the inlet valve 11. When the determination section 7B1 determines to execute the hill-hold control, the valve control section 7B5 closes the switching valve 10 so as to retain the brake force of the motorcycle 200. In addition, when the determination section 7B1 determines that the certain time has elapsed since the initiation of the retention mode, the valve control section 7B5 opens/closes the switching valve 10 to gradually reduce the brake force.

(Memory Section 7C)

The memory section 7C stores data related to the detection signals of the detection mechanism 8 and the like, for example. The memory section 7C can be constructed of a random access memory (a RAM) and the like, for example.

Control Flow Example of the First Embodiment

Figure 5:
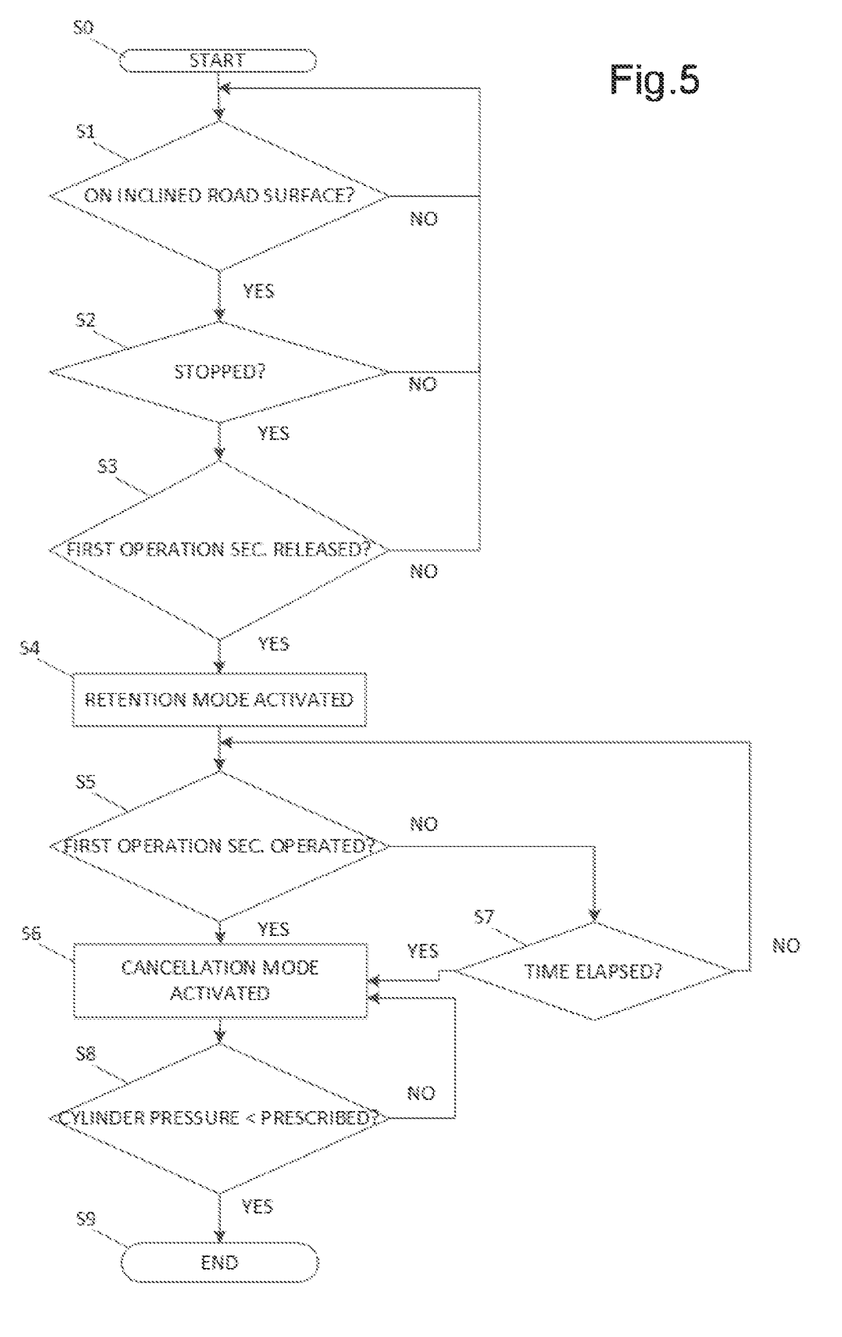
FIG. 5 is one example of a control flow of the controller according to the first embodiment of the invention.

FIG. 5 is one example of a control flow of the controller according to this first embodiment. A description will be made on the hill-hold control that is executed by the control section 7 of the controller 1 with reference to FIG. 5.
(Step S0: Start)
The control section 7 executes the control flow that includes the hill-hold control.
(Step S1: Determination Related to Execution Permission of Hill-Hold Control)
The determination section 7B1 of the control section 7 determines whether the motorcycle 200 is on the inclined road surface.
If it is determined that the motorcycle 200 is on the inclined road surface, the process proceeds to step S2.
If it is determined that the motorcycle 200 is not on the inclined road surface, step S1 is repeated.
(Step S2: Determination Related to Stop of Motorcycle 200)
On the basis of the wheel speed that is computed by the computation section 7B3, the determination section 7B1 of the control section 7 determines whether the motorcycle 200 is stopped.
If it is determined that the motorcycle 200 is stopped, the process proceeds to step S3.
If it is determined that the motorcycle 200 is not stopped, the process returns to step S1.
(Step S3: Determination Related to First Operation Section BR1)
On the basis of the detection signal of the first detection section SW, the determination section 7B1 of the control section 7 determines whether the first operation section BR1 is released.
If it is determined that the first operation section BR1 is released, the process proceeds to step S4.
If it is determined that the first operation section BR1 is not released, the process returns to step S1.
(Step S4: Execution of Retention Mode of Hill-Hold Control)
The control section 7 executes the retention mode of the hill-hold control. The control section 7 closes the switching valve 10 for the certain time so as to retain the brake force of the motorcycle 200.
(Step S5: Determination Related to First Operation Section BR1)
The determination section 7B1 of the control section 7 determines whether the first operation section BR1 is operated during the execution of the retention mode in the hill-hold control.
If it is determined that the first operation section BR1 is operated, the process proceeds to step S6.
If it is determined that the first operation section BR1 is not operated, the process proceeds to step S7.
(Step S6: Execution of Cancellation Mode of Hill-Hold Control)
The control section 7 executes the cancellation mode of the hill-hold control. In other words, the control section 7 cancels the retention of the brake force in the retention mode. More specifically, the control section 7 controls the switching valve 10 such that a reduction amount of the brake force per time becomes constant, for example.
(Step S7: Determination Related to Time Since Initiation of Retention Mode)
On the basis of the signal from the timer section 7B2, the determination section 7B1 of the control section 7 determines whether the certain time has elapsed since the initiation of the retention mode.
If it is determined that the certain time has elapsed, the process proceeds to step S6.
If it is determined that the certain time has not elapsed, the process returns to step S5.
(Step S8: Determination Related to Cylinder Pressure)
The determination section 7B1 of the control section 7 determines whether the cylinder pressure is lower than the prescribed pressure.
If it is determined that the cylinder pressure is lower than the prescribed pressure, the process proceeds to step S9.
If it is determined that the cylinder pressure is not lower than the prescribed pressure, the process returns to step S6.
(Step S9: End)
The control section 7 terminates the control flow that includes the hill-hold control.

Note that, in this first embodiment, the description has been made on the case where the determinations, which are described in step S1 to step S3 depicted in FIG. 5, are made prior to shifting to the hill-hold control; however, the invention is not limited thereto. For example, the determination on whether to shift to the hill-hold control may include a determination on whether the motorcycle 200 is in a low gear or the like.

Effects that the Controller 1 According to this First Embodiment Has

In the case where it is determined on the basis of the detection signal of the first detection section SW that the first operation section BR1 is operated when the brake force is retained in the hill-hold control, the control section 7 of the controller 1 according to this first embodiment cancels the retention of the brake force. In other words, even in the cases where the hill-hold control is executed and the brake force is being retained, the controller 1 according to this first embodiment cancels the retention of the brake force when the occupant performs a preset operation such as the pumping operation of the first operation section BR1.

For example, when an accelerating operation is adopted as the operation for canceling the retention of the brake force, a motion of turning the accelerator grip is required. It may be difficult to turn the accelerator grip for the operation depending on circumstances. Meanwhile, in regard to the controller 1 according to this first embodiment, for example, a motion of grabbing the handlebar lever 24 suffices, and thus a motion of shaking an arm is basically unnecessary. Therefore, operability at a time when the brake force retained in the hill-hold control is reduced is improved.

In addition, when the accelerating operation is adopted as the operation for canceling the retention of the brake force, a large number of motions have to be performed. More specifically, the occupant is required to make three-step motions of placing a hand on the accelerator grip, grabbing the accelerator grip, and turning the accelerator grip. Meanwhile, in regard to the controller 1 according to this first embodiment, the retention of the brake force in the hill-hold control can be cancelled in two-step motions of placing the hand on the handlebar lever 24 and grabbing the handlebar lever 24 or in two-step motions of placing a foot on the foot pedal 34 and depressing the foot pedal 34. Thus, in regard to the controller 1 according to this first embodiment, operability at the time when the brake force retained in the hill-hold control is reduced is improved.

In addition, the retention of the brake force is cancelled when the preset operation, such as the pumping operation, is performed on the first operation section BR1. Thus, the occupant can be prevented from unintentionally canceling the retention of the brake force during the retention mode of the hill-hold control.

Furthermore, in the cases where the occupant intentionally desires to cancel the retention of the brake force during the retention mode of the hill-hold control and the accelerating operation is adopted as the operation for canceling the retention of the brake force, engine noise is generated. The control section 7 of the controller 1 according to this first embodiment uses the operation of the first operation section BR1 to cancel the retention of the brake force in the retention mode of the hill-hold control. Thus, the noise is not generated.

Preferably, the control section 7 of the controller 1 according to this first embodiment cancels the retention of the brake force in the case where a prescribed time elapses from the initiation of the hill-hold control in a state where the retention of the brake force is not cancelled.

Differing from a parking brake that uses a wire cable, it is difficult to retain the brake force for a long time in the hill-hold control. When the prescribed time elapses, the control section 7 opens the switching valve 10 and reduces the brake force. In this way, the occupant can be promoted to operate the first operation section BR1, get off of the vehicle, move the vehicle to a flat road surface, and the like.

Second Embodiment

In the following description, a description that overlaps that of the first embodiment will not be made, and only different portions will be described.

Figure 6:
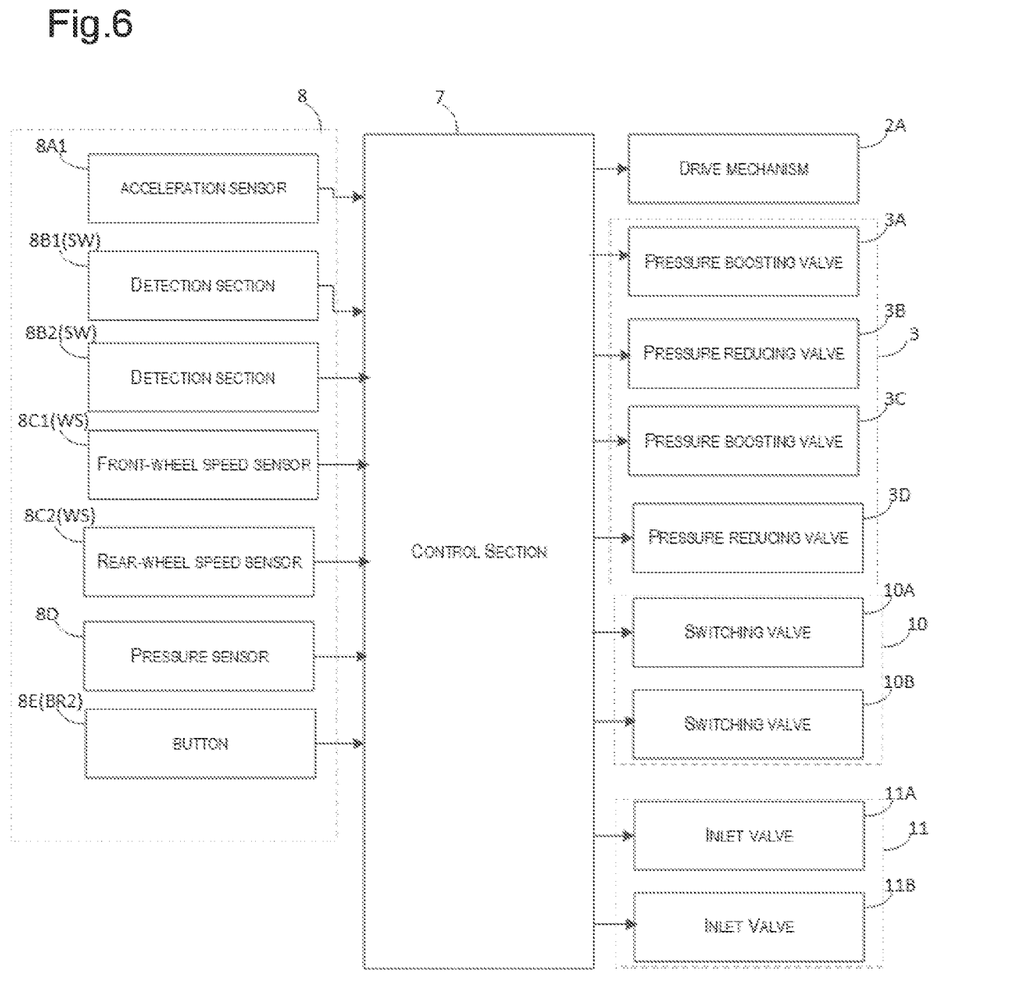
FIG. 6 is a functional block diagram of a control section of a controller according to a second embodiment of the invention.

FIG. 6 is a functional block diagram of a control section of a controller according to this second embodiment. A description will be made on the second embodiment with reference to FIG. 6.

In the first embodiment, the condition for canceling the brake force in the hill-hold control is the operation of the first operation section BR1. Meanwhile, in the second embodiment, the condition for canceling the brake force in the hill-hold control includes not only the operation of the first operation section BR1 but also an operation of a second operation section BR2.

In other words, in the case where the second operation section BR2, which differs from the first operation section BR1, is not operated, the control section 7 does not cancel the retention of the brake force during the hill-hold control even when the first operation section BR1 is operated. In the case where both of the operation of the first operation section BR1 and the operation of the second operation section BR2 are performed, the control section 7 cancels the retention of the brake force during the hill-hold control. Here, the second operation section BR2 is a button 8E that is attached to the motorcycle 200.

The determination section 7B1 determines whether the second operation section BR2 is operated during the execution of the retention mode. As the operation of the second operation section BR2, an operation of pressing the second operation section BR2 for the set number of times (once or plural times), a long pressing operation in which the second operation section BR2 keeps being pressed, or the like can be adopted. An on/off signal of the second operation section BR2 as the button is used for the determination of whether the second operation section BR2 is operated.

Control Flow Example of the Second Embodiment

Figure 7:
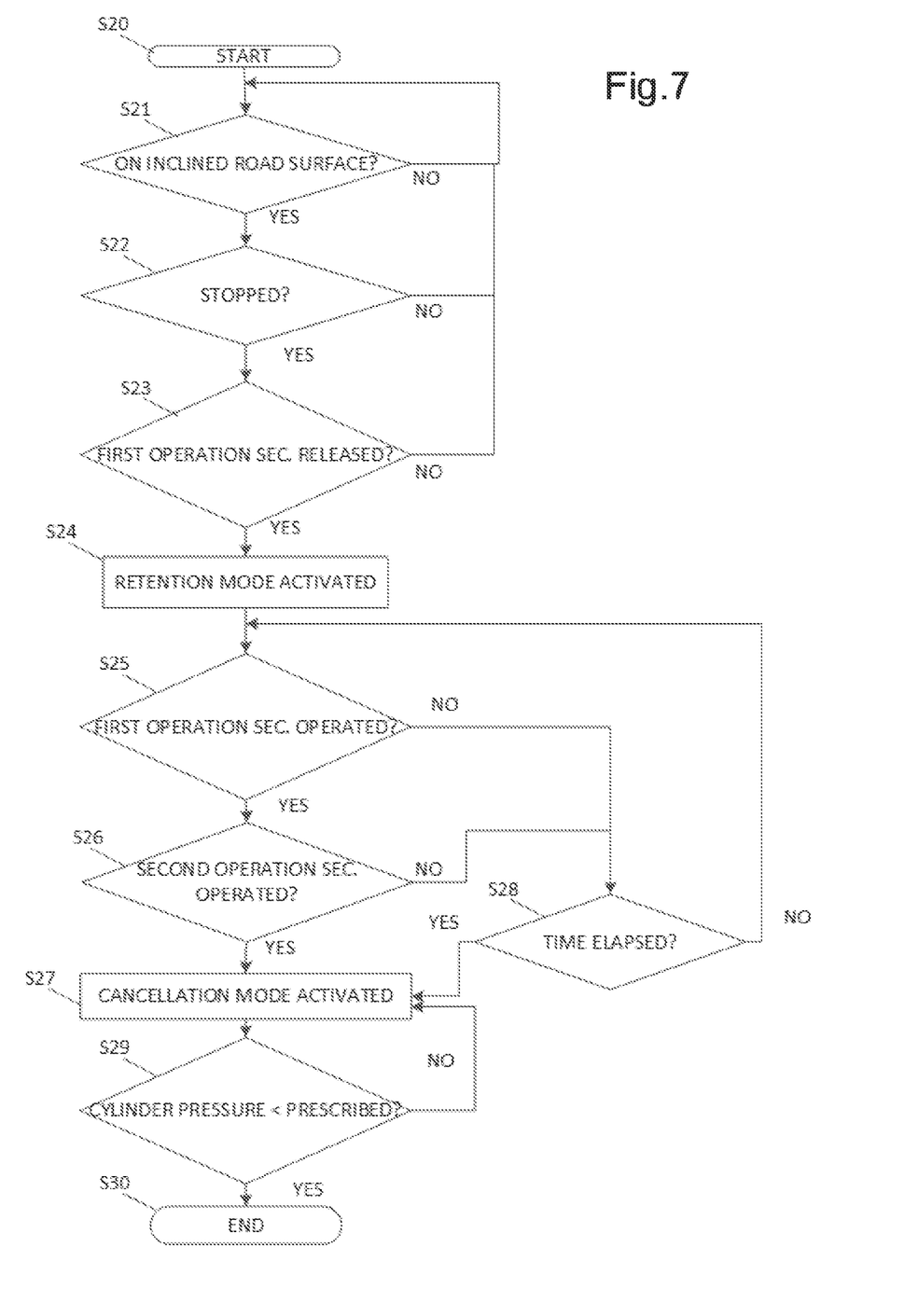
FIG. 7 is one example of a control flow of the controller according to the second embodiment of the invention.

FIG. 7 is one example of a control flow of the controller according to this second embodiment. FIG. 7 differs from FIG. 5 in a point that step S26 is added. Because step S20 to step S25 and step S27 to step S30 in FIG. 7 are respectively the same as step S0 to step S5 and step S6 to step S9 in FIG. 5, the description thereon will not be made.
(Step S26: Determination Related to Operation of Second Operation Section BR2)

The determination section 7B1 of the control section 7 determines whether the second operation section BR2 is operated during the execution of the retention mode in the hill-hold control.

If it is determined that the second operation section BR2 is operated, the process proceeds to step S27.

If it is determined that the second operation section BR2 is not operated, the process proceeds to step S28.

As described above, if it is determined in step S25 that the first operation section BR1 is operated and it is further determined in step S26 that the second operation section BR2 is operated, the process proceeds to step S27, and the retention of the brake force is canceled.

Meanwhile, if it is determined in step S25 that the first operation section BR1 is operated but it is determined in step S26 that the second operation section BR2 is not operated, the process proceeds to step S28. If the certain time elapses from the initiation of the retention mode, the retention of the brake force is cancelled. If not, the process returns to step S25.

Note that an order of step S25 and step S26 may be reversed.

Effects that the Controller 1 According to this Second Embodiment Has

Preferably, in the case where the second operation section BR2, which differs from the first operation section BR1, is not operated, the control section 7 does not cancel the retention of the brake force even when the first operation section BR1 is operated. In the case where both of the operation of the first operation section BR1 and the operation of the second operation section BR2 are performed, the control section 7 cancels the retention of the brake force. In this way, the occupant can be prevented from unintentionally canceling the retention of the brake force during the retention mode of the hill-hold control.

Modified Example of this Second Embodiment

Figure 8:
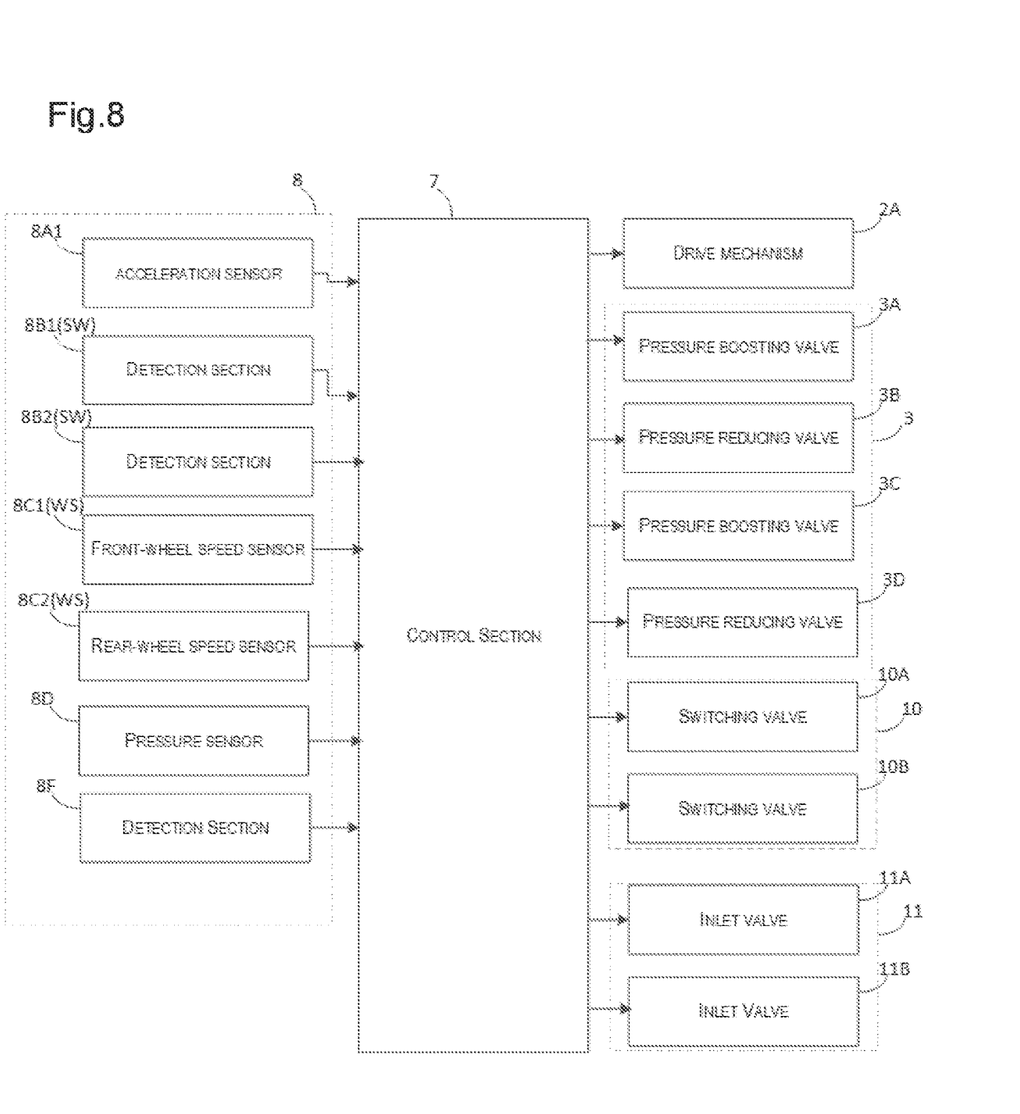
FIG. 8 is a functional block diagram of a control section of a controller according to a modified example of the second embodiment of the invention.

FIG. 8 is a functional block diagram of a control section of a controller according to a modified example of this second embodiment. In this second embodiment, the second operation section BR2 is the button 8E. In the modified example, the second operation section BR2 is the accelerator grip 70 (see FIG. 1) that is provided on the handlebar of the motorcycle 200. A second detection section 8F is provided in the accelerator grip 70. The second detection section 8F is a position detection sensor that is used to detect an operation of the accelerator grip 70 for operating an engine of the motorcycle 200, for example.

The determination section 7B1 determines whether the second operation section BR2 is operated while the retention mode is executed. As the operation of the second operation section BR2, a motion of turning the accelerator grip 70 can be adopted. An on/off signal of the second detection section 8F is used for the determination of whether the second operation section BR2 is operated.

Because a control flow in the modified example of this second embodiment is the same as that in FIG. 7, a description thereon will not be made.

Effects that a Controller 1 According to the Modified Example of this Second Embodiment Has A controller 1 according to the modified example of this second embodiment has similar effects to those of the controller 1 according to the second embodiment.

Note that the brake force of either one of the front wheel 20 and the rear wheel 30 may be retained, or the brake forces of both of the front wheel 20 and the rear wheel 30 may be retained in the retention mode of the hill-hold control in each of the first embodiment, the second embodiment, and the modified example thereof. Whether to select either one of the front wheel 20 and the rear wheel 30 or both of the front wheel 20 and the rear wheel 30 may be switched in accordance with the inclination value of the road surface that is obtained by the control section 7, for example.

REFERENCE SIGNS LIST

1: Controller
2: Pump device
2A: Drive mechanism
2B: Pump element
3: Regulating valve
3A: First pressure boosting valve
3B: First pressure reducing valve
3C: Second pressure boosting valve
3D: Second pressure reducing valve
4: Internal channel
4A: Internal channel
4B: Internal channel
5: Float restrictor
6: Accumulator
7: Control section
7A: Input section
7B: Processor section
7B1: Determination section
7B2: Timer section
7B3: Computation section
7B4: Drive mechanism control section
7B5: Valve control section
7C: Memory section
8: Detection mechanism
8A: Acceleration sensor
8B1: First detection section
8B2: First detection section
8C1: Front-wheel speed sensor
8C2: Rear-wheel speed sensor
8D: Pressure sensor
8E: Button
8F: Second detection section
10: Switching valve
10A: Switching valve
10B: Switching valve
11: Inlet valve
11A: Inlet valve
11B: Inlet valve
20: Front wheel
21: Front brake pad
22: Front wheel cylinder
23: Brake fluid pipe
24: Handlebar lever
25: First master cylinder
26: First reservoir
27: Brake fluid pipe
30: Rear wheel
31: Rear brake pad
32: Rear wheel cylinder
33: Brake fluid pipe
34: Foot pedal
35: Second master cylinder
36: Second reservoir
37: Brake fluid pipe
70: Accelerator grip
100: Hydraulic pressure control system
200: Motorcycle
B: Vehicle body
BR1: First operation section
BR2: Second operation section
C1: Front-wheel hydraulic circuit
C2: Rear-wheel hydraulic circuit
P: Port
SW: First detection section
T1: Arithmetic section
T2: Actuator control section
W: Wheel
WS: Wheel speed sensor

The invention claimed is:

1. A controller for controlling a deceleration brake mechanism that generates a brake force on a motorcycle, the controller configured to:
   execute a hill-hold control that retains the brake force on an inclined road surface;
   detect an operation of a first operator that operates the deceleration brake mechanism; and
   cancel retention of the brake force when it is determined, based on a detection signal of the operation, that the operation matches a predefined operation including at least one selected from the group consisting of a pumping operation in which the first operator is successively operated, a long pressing operation having a predetermined time of either of the first operator or of a second operator, and a combined operation of the first operator and of the second operator, wherein the first operator includes a handlebar lever or a foot pedal of the motorcycle.

2. The controller according to claim 1, wherein the controller cancels the retention of the brake force when a prescribed time elapses from initiation of the hill-hold control in a state where the retention of the brake force is not cancelled.

3. The controller according to claim 1, wherein the controller does not cancel the retention of the brake force when the first operator is operated but the second operator, which differs from the first operator, is not operated.

4. The controller according to claim 3, wherein the second operator is a button that is attached to the motorcycle.

5. The controller according to claim 3 further configured to detect the operation of the second operator, wherein the second operator is an accelerator grip of the motorcycle.

6. A control method of a motorcycle for executing hill-hold control that retains a brake force of a deceleration brake mechanism on an inclined road surface, the control method comprising the steps of:
   retaining the brake force in the hill-hold control;

determining whether a first operator for operating the brake mechanism is operated; and canceling retention of the brake force that is retained in the hill-hold control when it is determined that the operation matches a predefined operation including at least one selected from the group consisting of a pumping operation in which the first operator is successively operated, a long pressing operation having a predetermined time of either of the first operator or a second operator, and a combined operation of the first operator and of the second operator, wherein the first operator includes a handlebar lever or a foot pedal of the motorcycle.

* * * * *